United States Patent [19]

Sullivan et al.

[11] Patent Number: 5,028,808

[45] Date of Patent: Jul. 2, 1991

[54] DEVICES CAPABLE OF SENSING ROTARY MOTION

[75] Inventors: Terrance P. Sullivan, Lodi; Robin L. Roehl, Jamesville, both of Wis.

[73] Assignee: BOC Health Care, Inc., Murray Hill, N.J.

[21] Appl. No.: 380,564

[22] Filed: Jul. 14, 1989

[51] Int. Cl.[5] ..................... H01H 1/24; H01H 35/00; H01H 35/06; H02B 13/00

[52] U.S. Cl. .................................... 307/122; 324/690; 324/714; 310/339

[58] Field of Search ............... 307/134, 122, 116, 112, 307/126, 119-121; 324/658, 660, 686, 690, 714; 200/600, 211, 212; 340/870.3, 870.37, 686, 687; 73/488, 491, 494, 505, 509, 517 R, 518, 519; 310/339; 361/280

[56] References Cited

U.S. PATENT DOCUMENTS

| | | | |
|---|---|---|---|
| 3,226,496 | 9/1964 | Seabury, Jr. | 200/11 K |
| 3,321,592 | 5/1967 | Miller | 200/61.43 |
| 3,777,222 | 12/1973 | Harris | 341/26 |
| 3,895,288 | 7/1975 | Lampen et al. | 323/304 |
| 3,916,327 | 10/1975 | Lampen et al. | 328/147 |
| 3,968,467 | 7/1976 | Lampen et al. | 338/119 |
| 4,088,856 | 5/1978 | Tobben | 200/52 R |
| 4,217,473 | 8/1980 | Parkinson | 200/512 |
| 4,218,600 | 8/1980 | Kissner | 200/512 |
| 4,221,975 | 9/1980 | Ledniczki et al. | 307/116 |
| 4,243,853 | 1/1981 | Turner | 200/8 R |
| 4,246,452 | 1/1981 | Chandler | 200/5 A |
| 4,297,542 | 10/1981 | Shumway | 200/6 A |
| 4,317,970 | 3/1982 | Häfner et al. | 200/61.43 |
| 4,444,998 | 4/1984 | House | 178/19 |
| 4,494,105 | 1/1985 | House | 338/114 |
| 4,511,769 | 4/1985 | Sahakian et al. | 200/6 A |
| 4,581,500 | 4/1986 | Henderson et al. | 200/11 DA |
| 4,852,443 | 8/1989 | Duncan et al. | 200/600 |

OTHER PUBLICATIONS

IBM Technical Disclosure Bulletin, vol. 18, No. 10 (Mar. 1976).

Spectra Symbol Data Sheet (5 pages).

*Primary Examiner*—A. D. Pellinen

*Assistant Examiner*—Richard T. Elms

*Attorney, Agent, or Firm*—Roger M. Rathbun; Larry R. Cassett

[57] ABSTRACT

A rotation-sensing device for providing output signals that correspond to rotary hand movement made about the device by an operator is disclosed. The device comprises a cover member including an outer surface having a generally cylindrical, longitudinally elongate, non-rotatable protusion carried thereon. The protrusion projects outwardly from the outer surface and is provided with an outer periphery thereon. The device further includes a plurality of generally longitudinally elongate, circumferentially spaced, sensing means which are positioned adjacent the outer periphery of the protrusion and are responsive to the rotary hand movement of the operator for providing output signals corresponding to such movement. In addition, the device includes means coupled to the sensing means for leading the signals generated in the sensing means away from the switch device.

19 Claims, 10 Drawing Sheets

DEVICES CAPABLE OF SENSING ROTARY MOTION

FIELD OF THE INVENTION

The present invention relates to rotary switches, controllers, encoders, potentiometers, and the like, and, more particularly, to devices of that type which are essentially devoid of rotating parts but are nevertheless capable of sensing rotary hand movements made with respect thereto and providing output signals corresponding to such movements.

BACKGROUND OF THE INVENTION

Rotary switches, controllers, encoders potentiometers, and the like (hereinafter also referred to as "rotary switch devices") conventionally include both rotating parts and stationary parts therein. They are usually mounted on the rear surface of the front panel of an apparatus which is to be controlled and they include a rotary shaft that passes through an aperture in such panel. A control knob is usually fastened to the outer end of the rotary shaft. Examples of rotary switch devices of this type may be seen in U.S. Pat. Nos. 3,226,496 to Seabury, Jr., and U.S. Pat. No. 4,246,452 to Chandler. Such rotary switch devices, although capable of functioning satisfactorily, have unnecessarily limited useful service lives due to the facts that they have internal terminals that frictionally contact, and move with respect to, other internal parts, and that the interiors thereof are in communication with ambient atmosphere through the apertures in the front panel. Accordingly, the internal terminals and other internal parts contacted thereby are subject to frictional wear; any contaminants that are in the atmosphere may reach and adversely affect the interiors of the rotary switch devices; and uninhibited oxidation of the inner operating mechanisms of the devices may also take place, in each case limiting the effective service life of the affected device. In addition, the need for panel apertures to be employed in connection with rotary switch devices has limited the use of such devices in sensitive equipment (e.g., medical testing equipment) that is required to be isolated from ambient atmosphere during its use.

Consideration has heretofore been given to sealing the interiors of linear, as distinguished from rotary, switch devices. Examples of such sealed linear switch devices may be seen in U.S. Pat. No. 3,772,222 to Harris, U.S. Pat. No. 3,895,288 to Lampen et al., U.S. Pat. No. 4,217,473 to Parkinson, and U.S. Pat. No. 4,317,970 to Hafner et al. In linear switch devices of the foregoing type a flexible membrane sealingly covers an underlying switch mechanism, and depression of the membrane at an appropriate point on its surface causes the underlying switch contacts to close. Although sealed switch devices of the foregoing type provide satisfactory operation over long service lives, the constructions employed are not applicable to rotary switch devices.

It is, therefore, a primary object of the present invention to provide an improved rotary switch device.

Another object of the present invention is to provide an improved rotary switch device, the interior of which is sealed from communication with ambient atmosphere.

A further object of the present invention is to provide an improved rotary switch device that is essentially devoid of rotating parts but is, nevertheless, capable of sensing rotary hand motion made with respect thereto and providing an output signal corresponding to such movement.

Additional objects and advantages of this invention will become apparent as the following description proceeds.

SUMMARY OF THE INVENTION

Briefly stated, and in accordance with one embodiment of this invention, there is provided a rotation-sensing device for providing output signals that correspond to rotary hand movement made about the device by an operator. The device comprises a cover member including an outer surface having a generally cylindrical, longitudinally elongate, non-rotatable protrusion carried thereon. The protrusion projects outwardly from the outer surface and is provided with an outer periphery thereon. The device further includes a plurality of generally longitudinally elongate, circumferentially spaced, sensing means which are positioned adjacent the outer periphery of the protrusion and are responsive to the rotary hand movement of the operator for providing output signals corresponding to such movement. In addition, the device includes means coupled to the sensing means for leading the signals generated in the sensing means away from the switch device.

BRIEF DESCRIPTION OF THE DRAWINGS

While the specification concludes with claims particularly pointing out and distinctly claiming the subject matter regarded as the invention herein, it is believed that the present invention will be more readily understood from the following description, taken in conjunction with the accompanying drawings, in which:

FIGS. 6, 6A and 6B represent a flow chart illustrating the logic employed by the rotation-sensing device of the present invention during operation thereof;

DETAILED DESCRIPTION OF THE INVENTION

Figure 1:
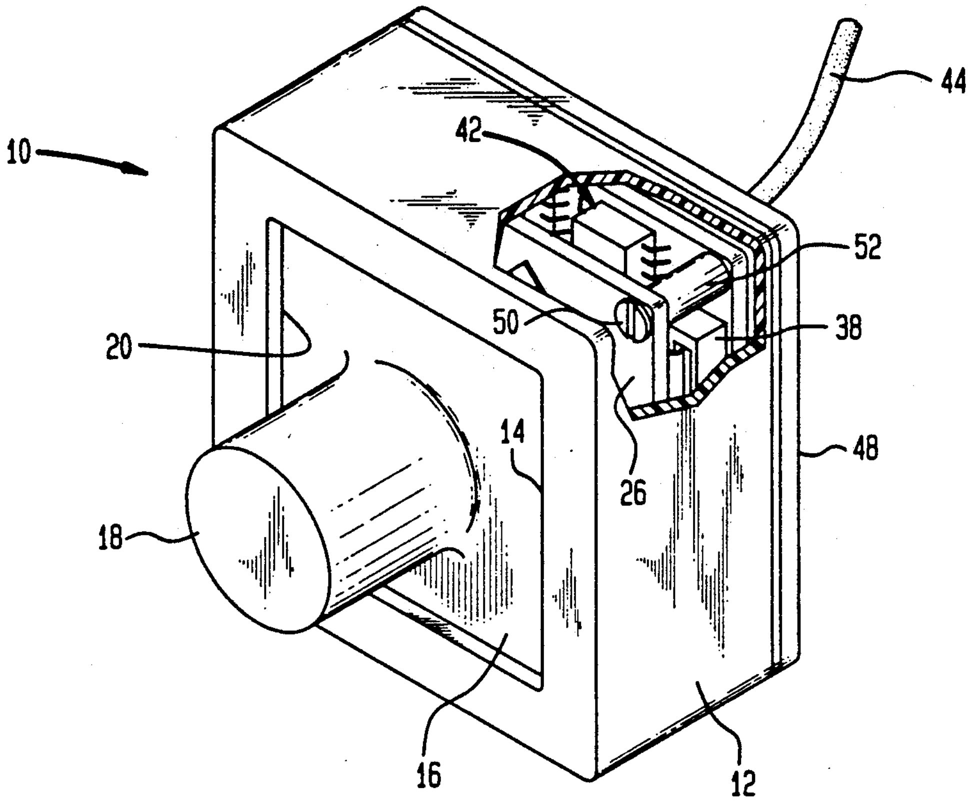
FIG. 1 is a perspective view, with parts cut away for clarity, of a rotation-sensing device in accordance with one embodiment of the present invention.
Figure 2:
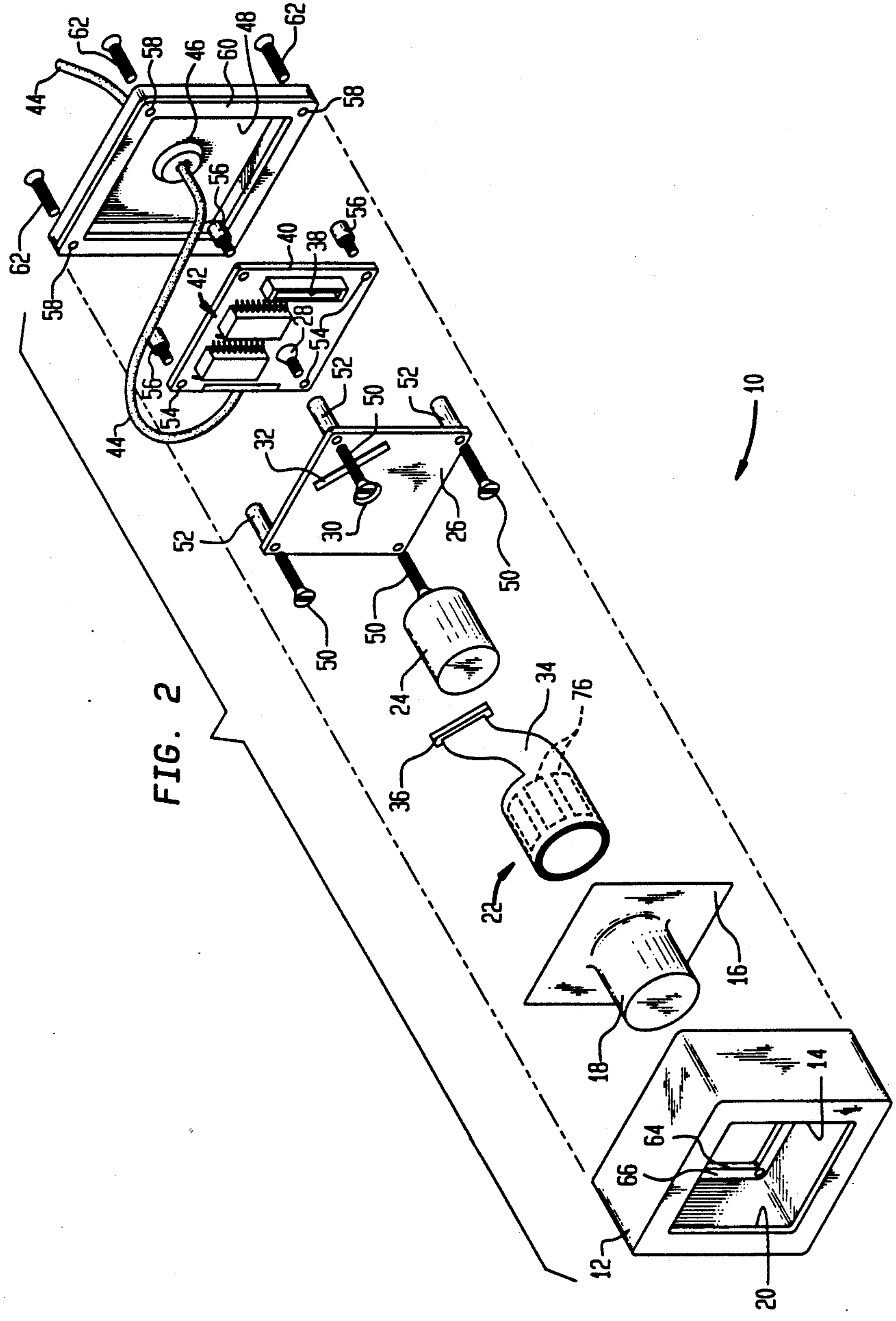
FIG. 2 is an exploded, perspective view of the rotation-sensing device of FIG. 1, showing the internal parts thereof in disassembled, aligned relation to one another.

Referring to FIGS. 1 and 2, a stand alone, independent, rotation-sensing device in accordance with the present invention has been illustrated generally at 10. The rotation-sensing device 10, which is adapted to be electrically connected to apparatus that is to be controlled thereby, is preferably housed in an enclosure or housing 12 so that the interior thereof is generally sealed off from the surrounding atmosphere to prevent the introduction of contaminants therein. The housing 12 is provided with a front opening 14 which is adapted to receive a flexible cover member 16 having a hollow knob or protrusion 18 formed therein that projects outwardly through the opening 14 of housing 12.

The cover member 16 is preferably formed from a sheet of polyester, polycarbonate or polyethylene material that is vacuum formed to provide the hollow protrusion 18 therein. The dimensions of the cover member 16 are such that the outer peripheral portion of the cover member abuts against a corresponding flange portion 20 of housing 12 when the components of the device 10 are assembled, in order to seal the cover member 16 against the flange 20 of the enclosure.

When the various components of the rotation-sensing device 10 are assembled, the hollow protrusion 18 closely surrounds a hollow rotary motion sensing device, shown generally at 22, which in turn, closely surrounds and is supported upon a core or mandrel 24. The core 24 is mounted on a backing plate 26 and held firmly thereto by means of a core mounting screw 28 which extends through an opening 30 in backing plate 26 into threaded engagement with a threaded aperture (not shown) that extends into the interior of core 24 from the rear surface thereof. Backing plate 26 is provided with a second opening or slot 32 therein which is adapted to accommodate the passage therethrough of a multiconductor pigtail 34 and a connector 36 that are carried by the rotary motion sensing device 22. The connector 36, after passing through the slot 32 in backing plate 26, is plugged into a receptacle 38 carried on a circuit board 40.

Circuit board 40 is provided with electrical circuits and microprocessor units, shown generally at 42, for processing the signals generated in sensing device 22 and providing output signals corresponding thereto on a cable 44. Cable 44 passes through a sealed feed-through element 46 carried by a back cover member 48 of the device 10 and extends out of the back surface of back cover member 48 for a sufficient length to enable it to be electrically coupled via suitable connectors (not shown) to a utilization device that is to be controlled by the rotary switch device 10.

The backing plate 26 is provided with recessed apertures having threaded bolts 50 mounted therein which threadedly engage with apertured spacers 52 carried by the backing plate 26, on the rear surface thereof. The spacers 52 serve to space the back surface of backing plate 26 from the electrical circuits and microprocessor units 44 on the front surface of circuit board 38. The circuit board 38 is also provided with apertures 54 that are aligned with the spacers 52, and threaded bolts 56 extend through the apertures 54 into threaded engagement with the threaded apertures in the spacers 52 to hold the circuit board 40 and backing plate 26 together in fixed relation to one another, with a predetermined spacing therebetween.

The back cover 48 is provided with apertures 58 and a weather-proof sealing grommet 60. The shanks of threaded bolts 62 are passed through apertures 58 and threadedly engage with openings 64 in a flange 66 formed at the rear of housing 12. When bolts 62 are tightened into openings 64, the weather proof grommet sealingly engages the rear flange 66 of the housing 12.

In assembling the various components of the rotation-sensing device 10 the rotary motion sensing device 22 is first mounted atop the core 24, in a manner to be described in greater detail hereinafter, and the core is then bolted to the front surface of backing plate 26 by means of the mounting screw 28. During the mounting of the core 24 to the backing plate 26, the connector 36 and pigtail 34 are passed through the slot 32 in the backing plate so as to be positioned for subsequent plugging into the receptacle 38 on circuit board 40. When the circuit board 40 and backing plate 26 are positioned adjacent to one another, the connector 36 is plugged into receptacle 38. The circuit board 40 and backing plate 26 are then fastened together by means of the through bolts 56 which pass through the apertures 54 into threaded engagement with the threaded interiors of the spacers 52. The through bolts 56 are provided with enlarged heads which are adapted to abut against the forward surface of the back cover 48 in order to provide sufficient space therebetween for the cable 44 to pass between circuit board 40 and the back cover, and into and through the feed-through element 46 to the exterior of the device. The cover member 16 is then positioned over the rotary motion sensing device 22 and moved relative thereto so that its rear surface comes into flush contact with the forward surface of backing plate 26.

At this point housing 12 and the subassembly comprising the cover member 16, backing plate 26 and circuit board 40 are telescoped together so that the outer periphery of the forward surface of the cover member engages the peripheral flange 20 of the housing 12 and the weather-proof sealing grommet 60 of the back cover 48 engages a rear peripheral flange 66 formed on the housing 12. The through bolts 62 are then threaded into threaded openings 64 in the flange 66 until the weather-proof seal grommet 60 sealingly engages with the outer surface of the flange 66 and the forward peripheral surface of the cover member 16 sealingly engages with the inner surface of the flange 20 of housing 12. It should be understood at this point that the spacings of the various interior components of the device are suitably dimensioned so that when the bolts 62 are taken up, seals will be effected both at the front flange 20 and the rear flange 66 of the device 10.

Referring now to FIGS. 3A-3D, the rotary motion sensing device 22 will now be considered in greater detail. As shown most clearly in FIG. 3D, the rotary motion sensing device 22 comprises a multi-layer cylindrical laminate **22*a*, 22*b* and 22*c* that is positioned about the surface of the core 24 and is preferably adhesively secured thereto. The various laminate layers 22*a*-22*c*** are preferably formed from sheets of flexible plastic material such as polycarbonate, polyester or acetate, having good insulating qualities.

The inner or first layer **22*a* (FIG. 3A) of the laminate preferably has printed thereon, for example with conductive silver ink, a plurality of pairs of spaced apart longitudinally elongate switch members, identified generally as switches SW1-SW8. Each of the switches SW1–SW8 includes a first conductor 70, one end of which is connected to a corresponding end of the first conductor 70 of every other pair and to a ground potential terminal in the connector 36, and a second conductor 72, each of which is connected to a separate corresponding terminal in the connector 36**.

The intermediate or second layer 22b (FIG. 3B) of the laminate has a plurality of elongate cut-out portions 74 therein which are aligned and associated with each of the corresponding switches SW1–SW8 so that when laminate layer 22b is superimposed on top of laminate layer 22a, the conductors 70 and 72 of each of the switches SW1–SW8 are exposed within the central opening 74 of each of the switches.

Figure 3D:
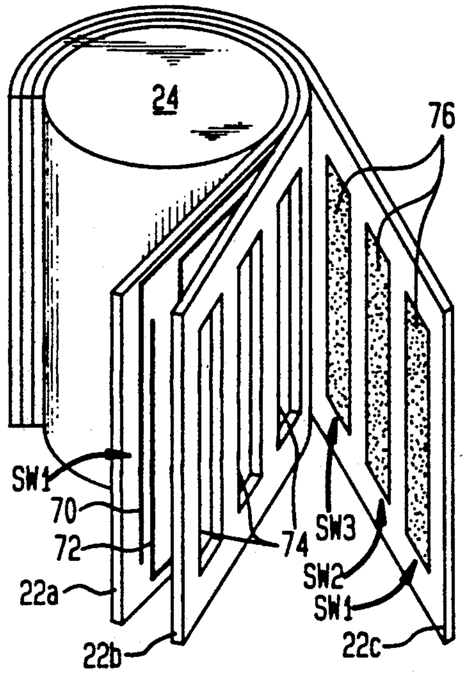
FIGS. 3A–3D are enlarged views of the components employed in a multi-layered, multi-element, rotary movement sensing device utilized in the rotation-sensing device of this invention, with FIGS. 3A–3C showing the various layers employed therein in plan and FIG.3D showing the various elements interleaved with one another and partially wound onto a supporting mandrel.
Figure 3A:
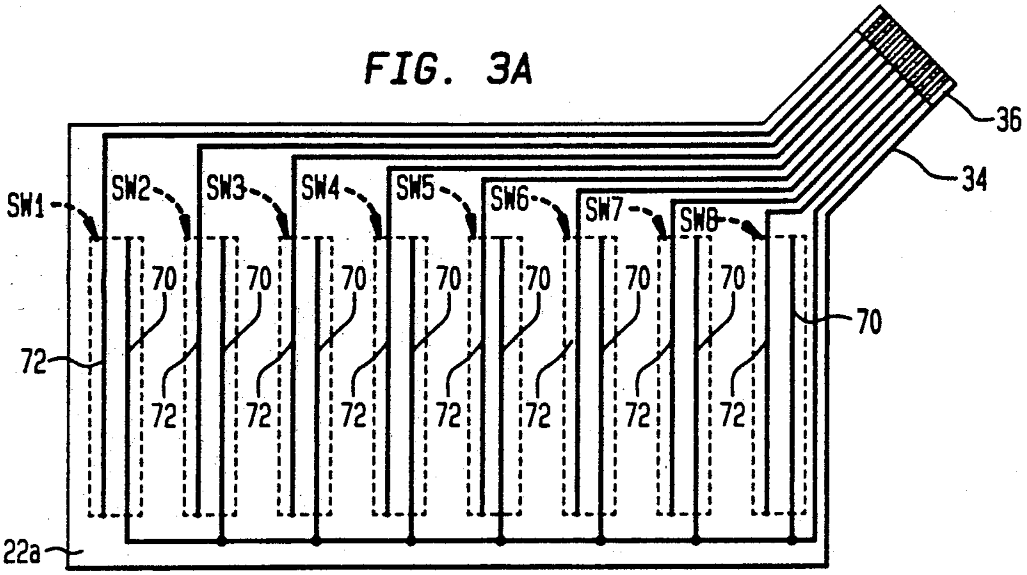
Figure 3B:
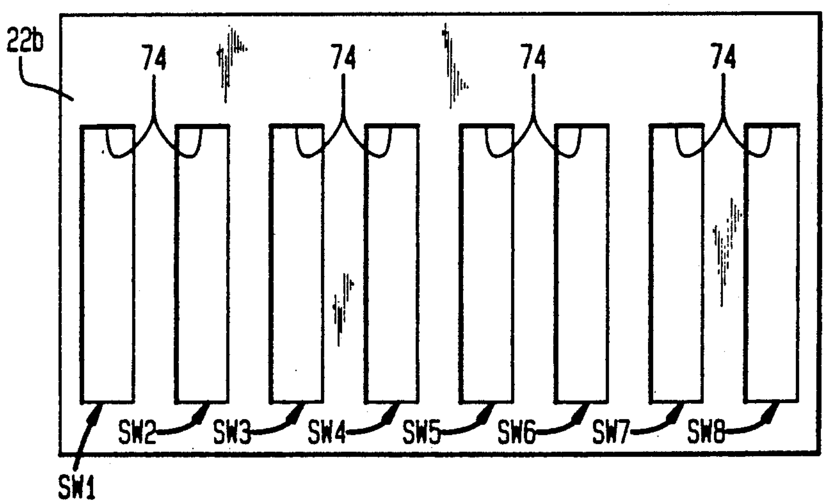
Figure 3C:
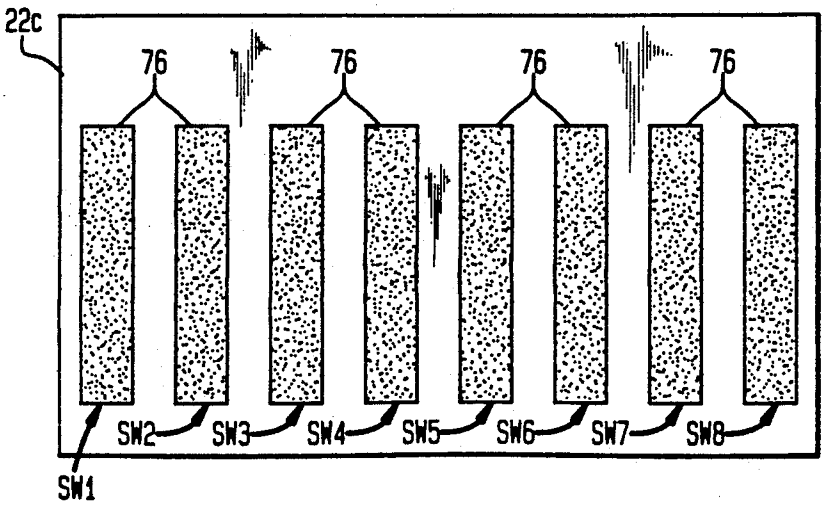

As shown most clearly in FIG. 3C, the third or outer laminate layer 22c has a plurality of longitudinally elongate rectangular conductive areas 76 printed thereon, for example with conductive silver ink, which, when the layer 22c is assembled atop the layer 22b, overlie the openings 74 of layer 22b in spaced relation to the pairs of conductors 70–72 on layer 22a. The arrangement is such that when the three layers are adhered together about a core 24, as shown in FIG. 3D, and the outer layer is pressed radially inwardly at a point corresponding to any one of the switches SW1–SW8, the conductive area 76 of the corresponding switch is depressed through the cut-out portion 74 of the switch, into contact with the conductor 72 thereof to provide a path to ground through that switch for the terminal to which the conductor 72 is connected in connector 36. Similarly, when the device 10 (FIG. 1) is in its assembled condition and the protrusion 18 is grasped by the thumb and index finger of an operator, with sufficient pressure to cause closing of the switches SW1–SW8 corresponding to the positions of the thumb and forefinger, the rotary motion sensing device 22 will provide an output signal through connector 36 indicative of the switches that are closed. In addition, rotation of the user's thumb and forefinger about the stationary protrusion 18 will cause successive openings and closings of the various switches SW1–SW8 in a direction and at a rate determined by the direction and the rate of rotation of the user's hand.

Figure 4B:
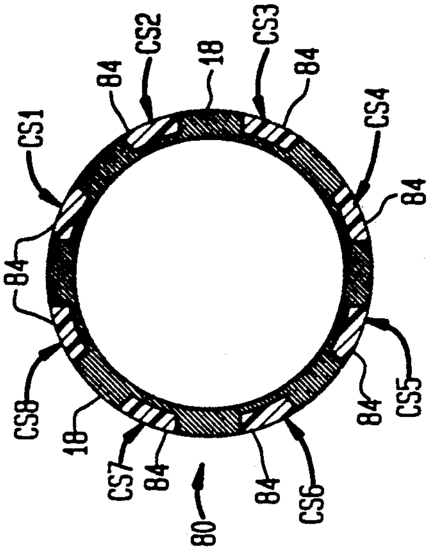
FIGS. 4A, 4B and 4C are a perspective and two sectional views, respectively, of alternate forms of rotary movement sensing devices that may be utilized in the rotary motion switch device of FIG. 1.
Figure 4C:
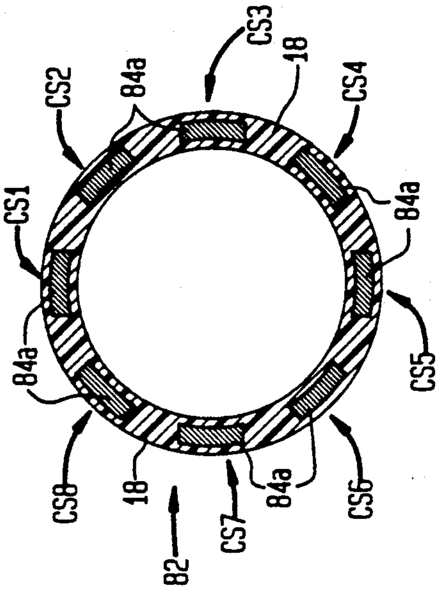
Figure 4A:
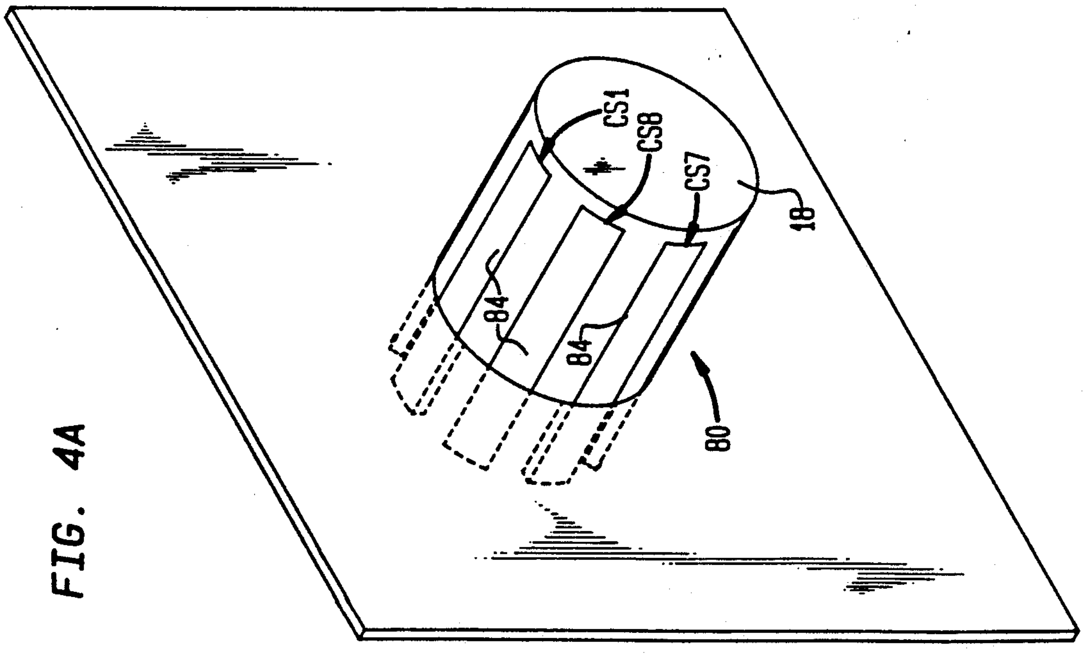

Referring now to FIG. 4A, 4B and 4C, one alternative version of the rotary motion sensing device 22 is shown generally at 80 in FIGS. 4A and 4B, and a second alternative version thereof is shown at 82 in FIG. 4C. The rotary motion sensing device 80 of FIGS. 4A and 4B comprises a plurality of conductive strips 84 that are embedded in the outer surface of protrusion 18 at equiangular spaced positions thereabout. In this case, the various conductive strips 84 comprise a plurality of capacitive sensors CS1–CS8 which correspond to the switches SW1–SW8 of the embodiment of the rotary motion sensing device shown in FIGS. 3A–3B. When the user's thumb and forefinger rotate about the periphery of the protrusion 18, the various capacitive sensors CS1–CS8 are discharged or charged in turn, depending upon the position of the user's thumb and forefinger, and this information is transmitted to a connector (not shown) that corresponds to the connector 36 for further utilization by the electrical circuits and microprocessors of the device.

As shown in the embodiment of FIG. 4C, the conductive strips 84a of the various capacitive sensors CS1–CS8 may be embedded beneath the outer surface of the protrusion 18, rather than at the outer surface thereof. Also, although the protrusions 18 in FIGS. 4A–4C are shown as being hollow, it is apparent that they could equally well be of solid cross-sectional construction, or that the hollow protrusion 18 could be mounted on a solid core or mandrel (not shown).

Although the various embodiments of FIGS. 3A–3D and 4A–4C are shown with either eight switches SW1–SW8 or eight capacitive sensors CS1–CS8, each of which switches or sensors is equally spaced from the others thereof either at or near the outer periphery of the protrusion 18, it will also be clear to those skilled in the art that for greater sensitivity, additional switches or capacitive sensors can be added thereto so that more detailed sensory information can be generated by the rotary motion sensing devices 22, 80 and 82. Moreover, it will also be apparent that other equivalent sensing devices, for example photocells and light sources therefor, can be positioned about the periphery of the protrusion 18. Such sensing devices will also provide output signals corresponding to the rotary movement of the user's thumb and forefinger.

Figures 5, 5A:
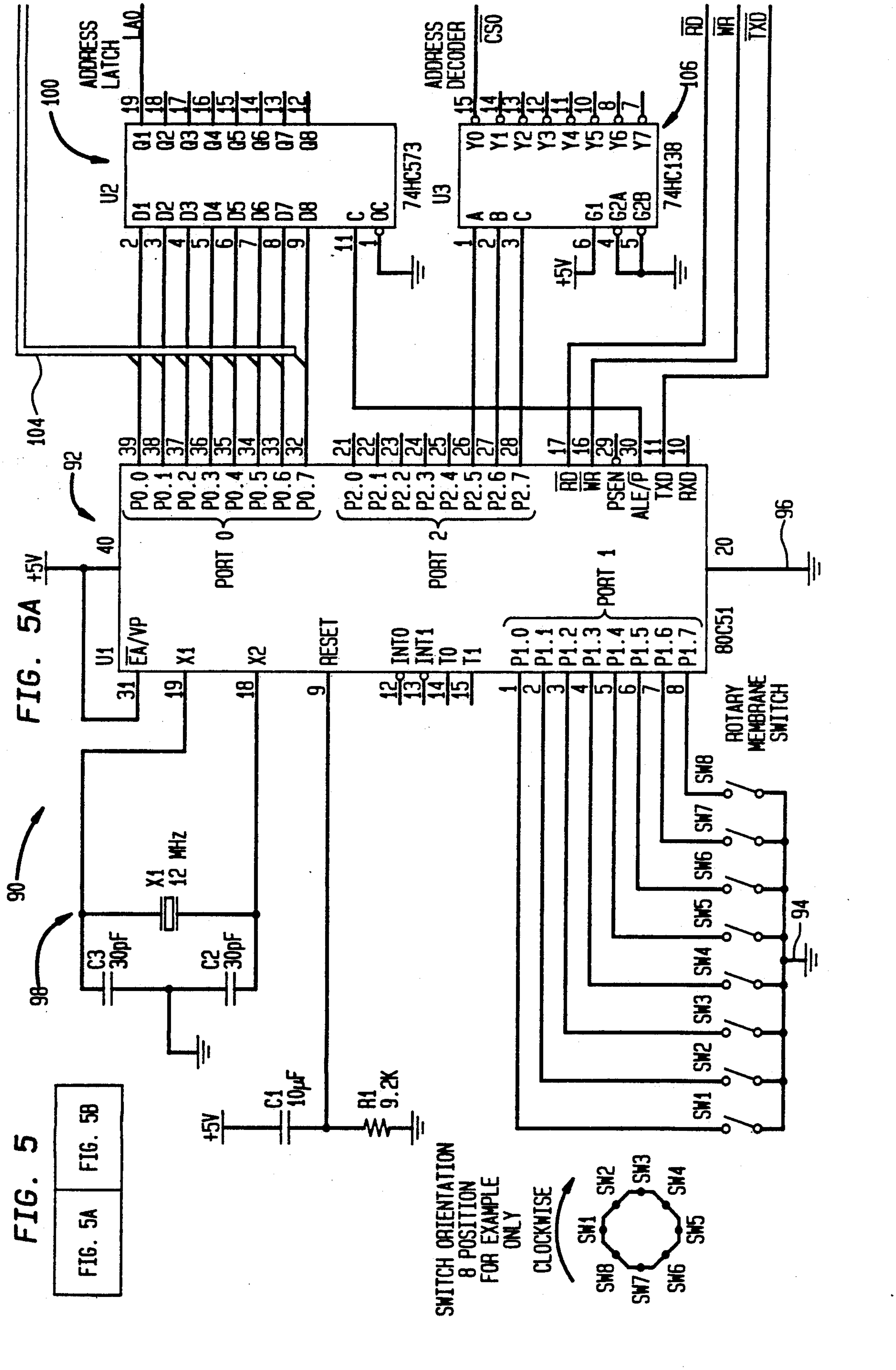
FIGS. 5, 5A and 5B represent a schematic wiring diagram of electrical components that may be employed in a rotation-sensing device in accordance with the present invention.
Figure 5B:
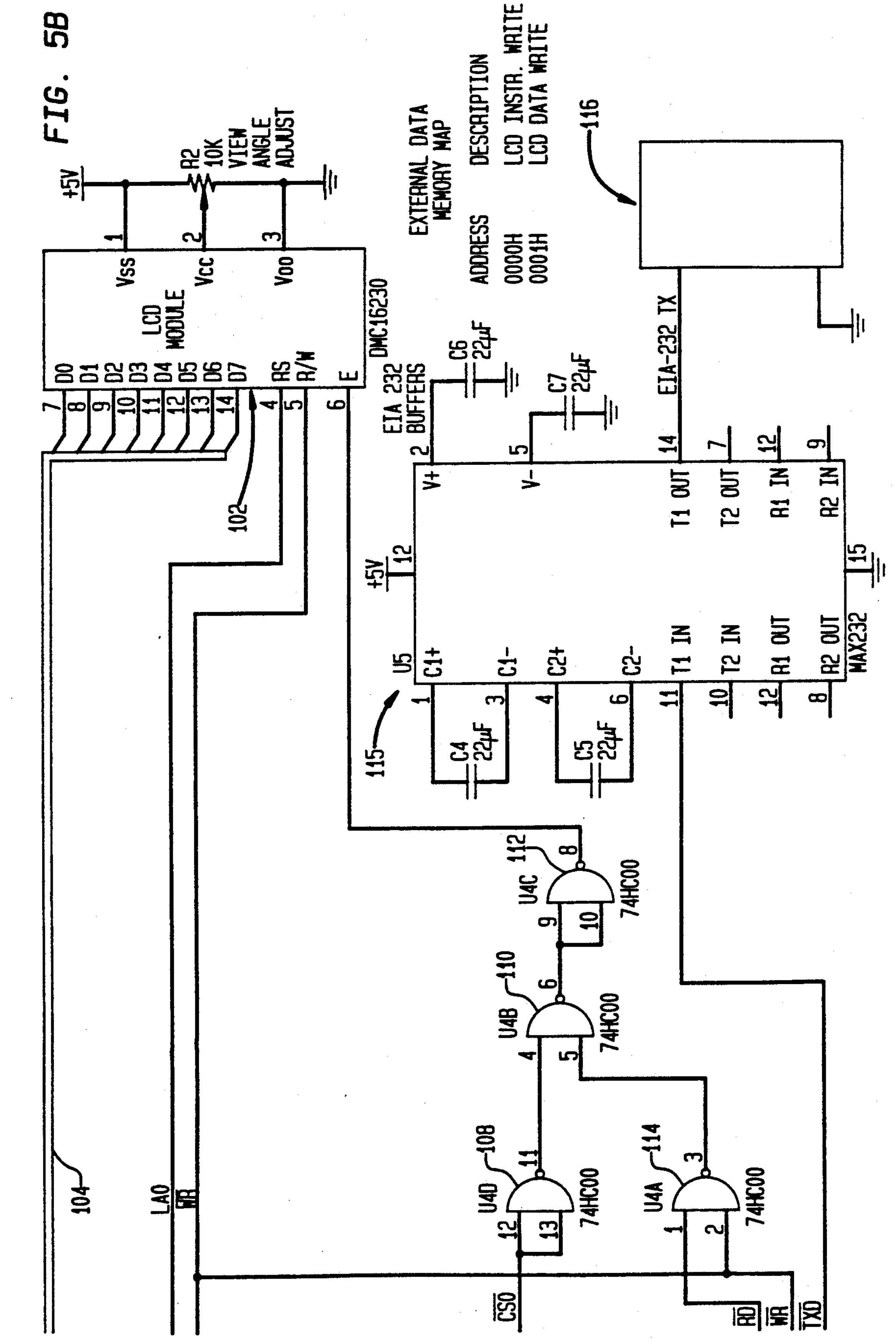

Referring now to FIGS. 5, 5A and 5B electrical circuits and components that may be employed in a rotation-sensing device in accordance with the present invention have been illustrated generally at 90°. The electrical circuits 90 are illustrated in a configuration in which the various outputs of the switches SW1–SW8 of the embodiment of the invention shown in FIGS. 3A–3D are applied as inputs to Port No. 1 (P1.0–P1.7) of a micro-processor unit 92, for example, an Intel 80C51 CPU microprocessor, at terminals 1–8 of the microprocessor 92. The common or ground sides 94 of switches SW1–SW8 are connected to the common or ground terminal 96 of microprocessor 92.

A suitable timing network, shown generally at 98, including, for example, a 12 megahertz crystal, is connected across terminals 18 and 19 of the microprocessor, and constitutes the inputs X1 and X2 thereof. Also, a five volt input is capacitively coupled via capacitor C1 to terminal 9, the reset terminal, of the microprocessor so that, upon start-up of the unit, the microprocessor is automatically reset.

Port No. 0 (P0.0–P0.7) of the microprocessor is connected via its terminals 39-32 both to corresponding terminals D1–D8 on an address latch unit, shown generally at 100, for example a Texas Instruments Corporation 74HC573 8-bit address latch unit, and to the corresponding terminals D0–D7 of a liquid crystal display module or LCD module, shown generally at 102, via a data bus 104. The LCD module 102 may comprise an Optrex Corporation DMC16230 LCD module distributed by the Asahi Glass EMP Corporation of Southfield, Michigan.

The address latch unit 100 provides outputs via its terminal Q1 and conductor LA0 to input terminal RS of the LCD module 102. Output WR on terminal 16 of microprocessor unit 92 is led to input R/W of the LCD module 102. Signals LAO and WR together enable write instructions and write data, as well as read instructions and read data, to be sent to the LCD module. The signals sent to the LCD module 102 via conductors LA0 and WR operate in conjunction with the data transmitted to the LCD model via the data bus 104. The address latch unit 100 is enabled by a signal generated in the microprocessor unit 92 and transmitted from terminal ALE/P thereof to the address latch unit via a conductor interconnecting the ALE/P terminal (terminal 30) with the address terminal C (terminal 11) of the latch unit 100.

Three terminals of Port 2 of the microprocessor unit, terminals P2.5, P2.6 and P2.7, are connected via conductors to the A, B and C inputs of, for example, a Texas Instruments 74HC138 address decode unit 106. The output from terminal YO (CS0) of the address decode unit 106 passes through a NAND gate unit 108 that is wired as an inverter, to one terminal of a second NAND gate unit 110. NAND gate unit 110, when enabled, passes the signal to the input of a third NAND gate unit 112, also wired as an inverter, and thence to the input E of LCD module 102. The outputs RD and WR of microprocessor unit 92 are led to the inputs of yet another NAND gate unit 114 which unit, when enabled, provides a second input to the NAND gate unit 110.

The various NAND gate units 108, 110, 112 and 114 preferably each comprise type 74HC00 quadruple two-input positive NAND gate units, for example the quadruple two-input positive NAND gates made by Texas Instruments Corporation.

The output TXD of microprocessor unit 92 constitutes a serial output port which provides an output signal from the microprocessing unit through a buffer 115, for example a Maxim Integrated Products RS-232 Driver/Receiver, to a utilization device 116. As wired, the control signals being sent to the utilization device 116 from the serial port terminal TXD are also displayed in the display of the LCD module 102 to inform the user of the inputs that are being provided to the utilization device 116. Utilization device 116 may comprise, for example, a ventilator or other component of a medical anaesthesia system.

Figure 6A:
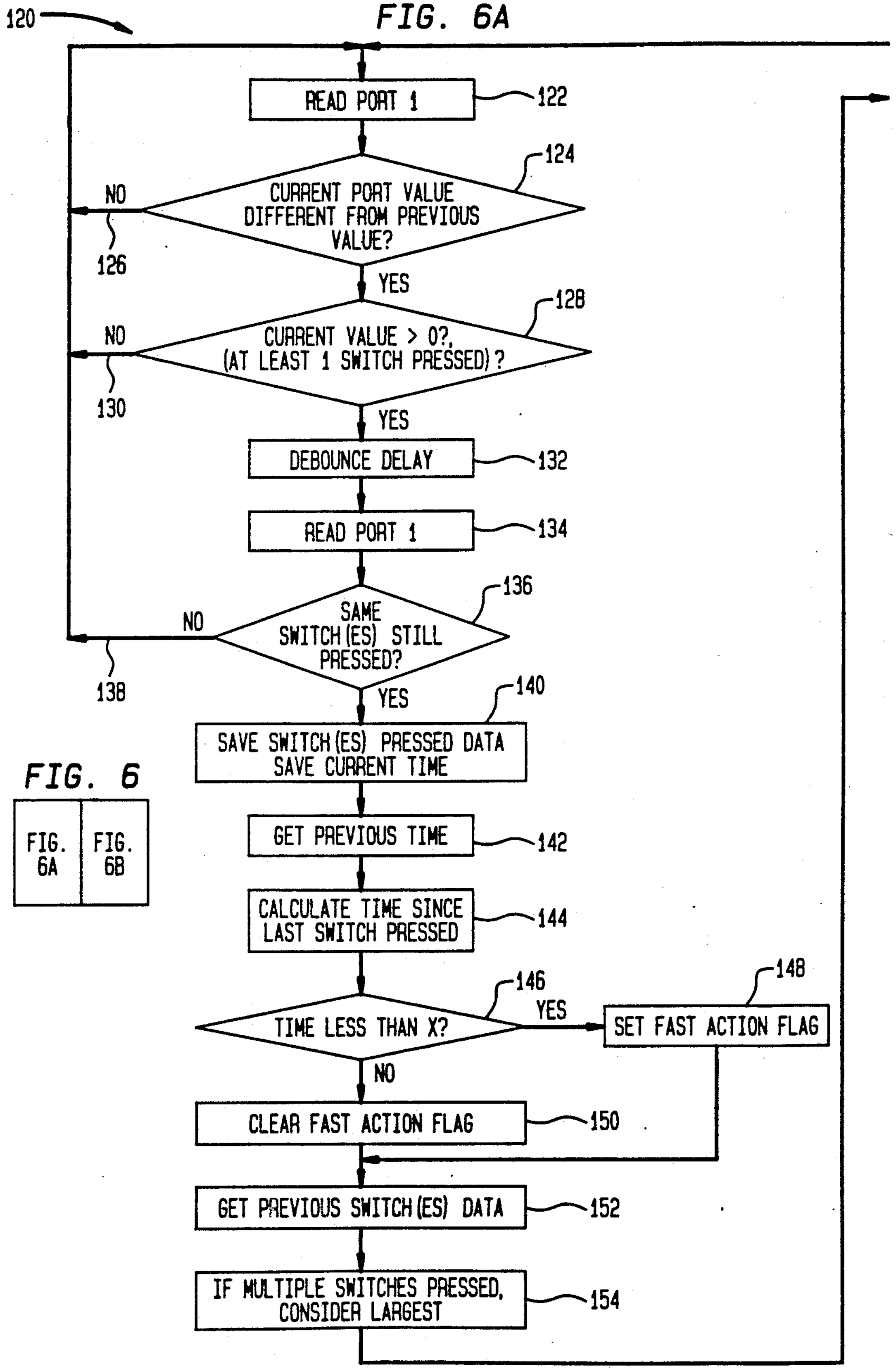
Figure 6B:
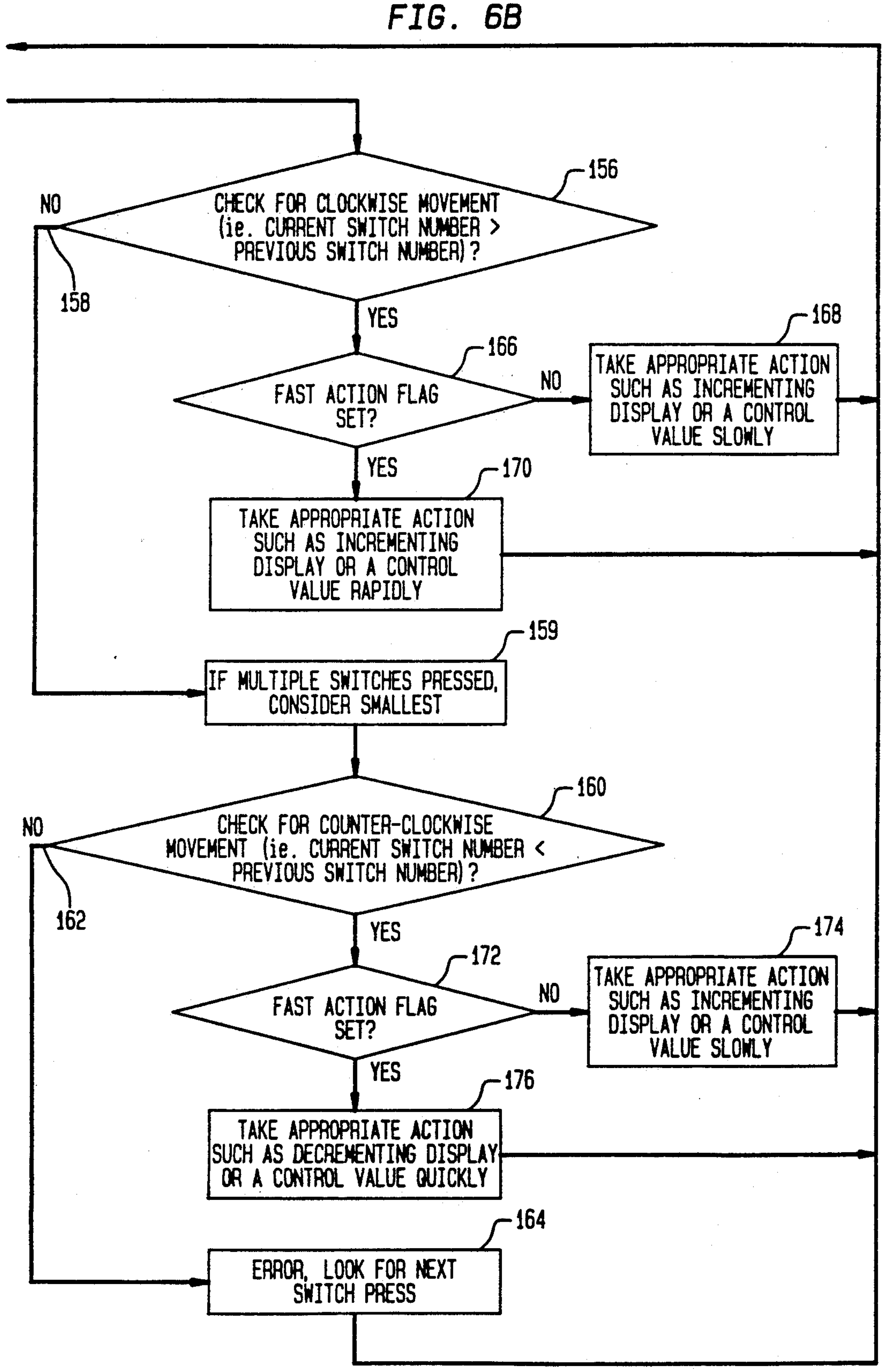

Referring now to FIGS. 6, 6A and 6B a logic flow chart, illustrating the logic employed by the electrical circuits and components 90 of FIG. 5, has there been illustrated generally at 120. The logic flow chart 120 lists the steps taken by the electrical circuits and components 90 of the rotary switch device 10 during its operation. Since any one of numerous operating programs can easily be written by one of ordinary skill in the art, based on the logic flow chart 120, it is not believed necessary to set forth a detailed operating program herein.

As will be recalled from the discussion of FIGS. 5, 5A and 5B upon energization of the electrical control circuitry and components 90, a reset signal is generated to reset the microprocessor unit 92. Following reset, the software program repetitively reads the signals arriving at the terminals P1.0–P1.7 of Port 1 of the microprocessor, as shown at 122, and a decision is made as to whether the current values at port 1 are different from previous values at Port 1, as shown at 124. If there is no difference in the previous and current values at Port 1, the program loops, as shown at 126, and continues to read and compare these values. If a difference is determined between the current Port 1 value and the previous values thereof, the program proceeds to the next decision point, shown at 128. At decision point 128 a determination is made as to whether or not the current value is greater than 0, signifying that at least one of the switches SW1–SW8 is depressed. If there is no current value greater than 0, the program loops, as shown at 130, and continues taking readings of Port 1.

If a current value greater than 0 is determined to exist at point 128, the program proceeds to the next step, at which a debounce delay is introduced to allow the various changed switch contacts to stabilize, and the readings at Port 1 are read, as indicated at 134, to determine if the current values of the switches at Port 1 that were read at point 122 are still present at decision point 136. If they are not, the program loops, as shown at 138, and the reading process starts over again.

If the current value readings at decision point 136 are the same as those read at point 122 and passed through the debounce delay 132, the data as to current switch values and current time is saved in memory, as shown at 140. The time at which the last previous saving of data occurred is then recalled from memory, as shown at 142, and a calculation of the elapsed time is made, as shown at 144. The elapsed time is indicative of the rate of rotation of the user's hand about the protrusion 18 (FIG. 1) on the rotary switch device 10.

If the elapsed time calculated at point 144 is less than a predetermined amount, indicating a high rate of rotation, a decision point at 146 sets a fast action flag, as indicated at 148. If the elapsed time is determined to be more than the predetermined amount, any previously set fast action flag is cleared, as shown at 150.

At this point, data with respect to the previous switch readings is recalled from memory, as shown at 152, and the largest of the current multiple switches that are depressed is noted, as shown at 154. A comparison of the data obtained at points 152 and 154 is made at decision point 156 to determine whether or not clockwise movement has occurred. If no clockwise movement has occurred, as indicated by the path shown at 158, the smallest of the current adjacent switches that are depressed is noted, as shown at 159, and it is compared with the previous smallest switch value encountered to determine whether counter clockwise movement has occurred, as shown at 160. If no counter clockwise movement is determined, as shown at 162, an error is presumed to have occurred, as shown at 164, and the program loops back to point 122 to consider the next switch depressions.

Returning to decision point 156, if clockwise movement is determined to have occurred at that point, a check is made at decision point 166 to determine whether a fast action flag has previously been set. If no fast action flag has previously been set, appropriate action is taken by the circuitry to slowly increment a display or slowly increment the control setting of the device being controlled, as indicated at 168. If the fast action flag has previously been set, the program proceeds from decision point 166 to take appropriate action to rapidly increment the display or rapidly increment changing the control setting of the device being controlled, as indicated at 170.

Similarly, considering the decision point 160 at this time, if counter clockwise movement is determined to have occurred, a check is made at decision point 172 to determine whether or not the fast action flag has previously been set. If it has not been set, appropriate action is taken to slowly decrement the display or to slowly decrement the control setting of the device being controlled, as shown at 174. Alternatively, if the fast action flag has been determined to have been previously set at decision point 172, such appropriate decrementing actions are initiated on a rapid basis at point 176.

In either of the foregoing events the program loops back to the starting point 122 after the appropriate action has been taken. The program thereafter continuously repeats itself, taking appropriate actions based on the readings and calculations made by the program software in accordance with flow chart 120.

Figure 7:
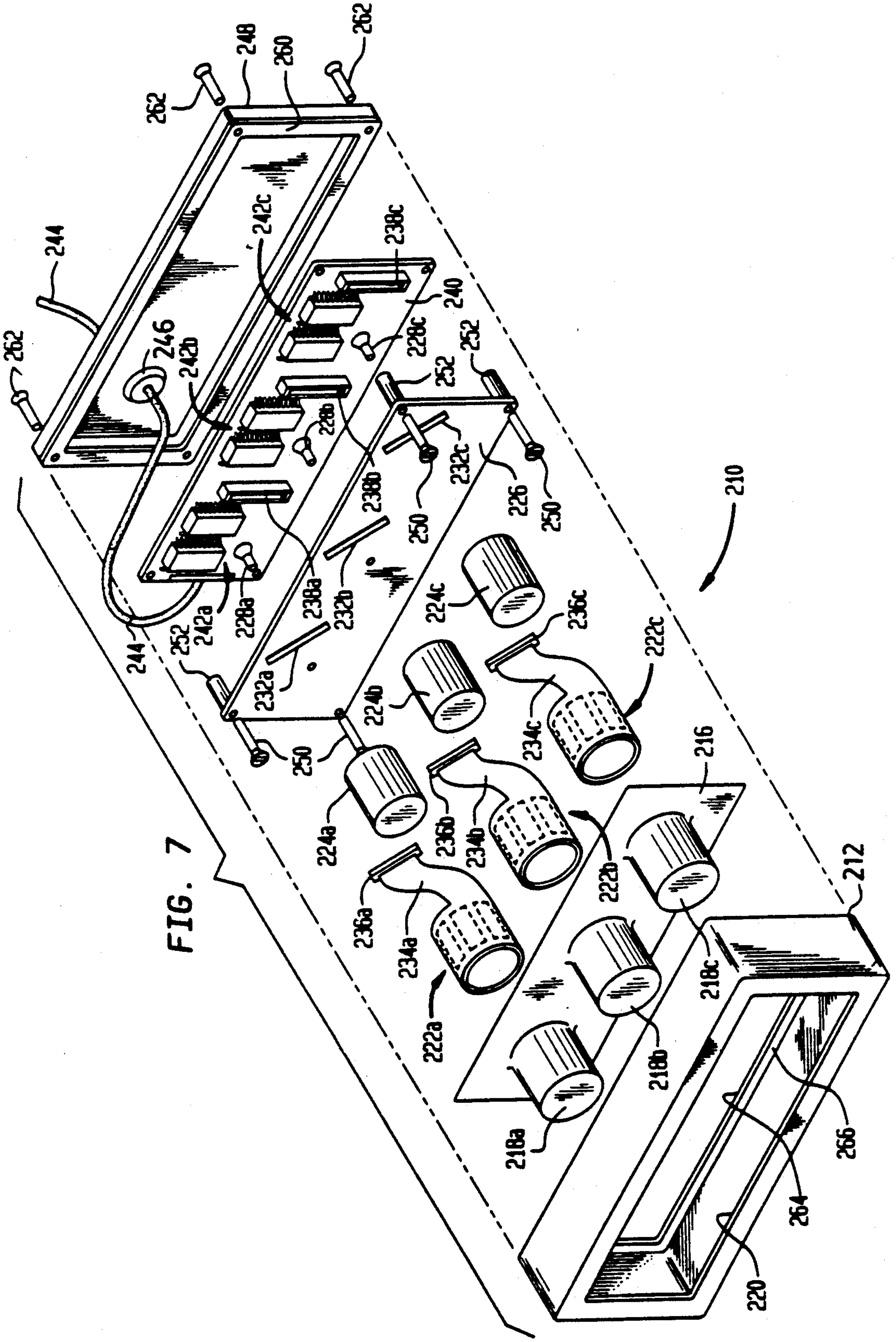
FIG. 7 is an exploded, perspective view of an alternate embodiment of the invention, employing multiple rotation-sensing devices therein; and, FIG. 8 is an exploded, perspective view of yet another embodiment of this invention, employing multiple rotation-sensing devices, a group of conventional membrane type switches, and a display window for displaying an output of an apparatus that is being controlled by the rotation-sensing devices and on which the rotation-sensing devices are mounted.

Referring now to FIG. 7, an alternate embodiment of the rotation-sensing device of the present invention has been illustrated generally at 210. The rotation-sensing device 210 is a multiple protrusion, independent unit that is adapted to be connected to a utilization device (not shown). Thus, device 210 includes three knobs or protrusions 218a, 218b and 218c that surround corresponding rotary motion sensing devices 222a, 222b and 222c. The sensing devices 222a, 222b and 222c are each similar to those described in connection with FIGS. 1-3C. Each of the sensing devices 222a, 222b and 222c is mounted on a corresponding core 224a, 224b and 224c that, in turn, is fixed to a backing plate 226 by corresponding mounting screws 228a-228c. The backing plate 226 is spaced from and fixed to a circuit board 240 having three corresponding electrical circuit and microprocessor units 242a, 242b and 242c thereon. The outputs of the various electrical circuits 242a-242c appear on a cable 244 which passes through a feed-through seal 246 formed in the back cover 248 of the device. Alternatively, it will be apparent to those skilled in the art that a single microprocessor could be configured to interface to all three of the rotary switches of rotary switch device 210.

As in the case of the embodiment of FIGS. 1-3C, the flexible cover member 216 is assembled into flush contact with the backing plate 226 after the rotary sensing devices 222a-222c have been mounted upon cores 224a-224c, and after the pigtails 234a-234c and connectors 236a-236c thereof have been passed through the slots 232a-232c of the backing plate 226 and have been plugged into their corresponding receptacles 238a-238c in circuit board 240.

With cover member 216 flush against the backing plate 226 and the backing plate 226 bolted to the circuit board 240, the assemblage is passed through the opening 264 in flange 266 of housing 212 until the forward peripheral surface of the cover member 2!6 seals against the rear surface of the flange 220 and the sealing grommet 260 on back cover 248 seals against the back of flange 266. At this point, the various through bolts 262 are drawn up to seal the internal components of device 210 with respect to the surrounding atmosphere.

Thus, the embodiment of FIG. 7 includes three rotation-sensing devices in a single housing, together with a cable output that provides three independent rotary control signals to a utilization device.

Figure 8:
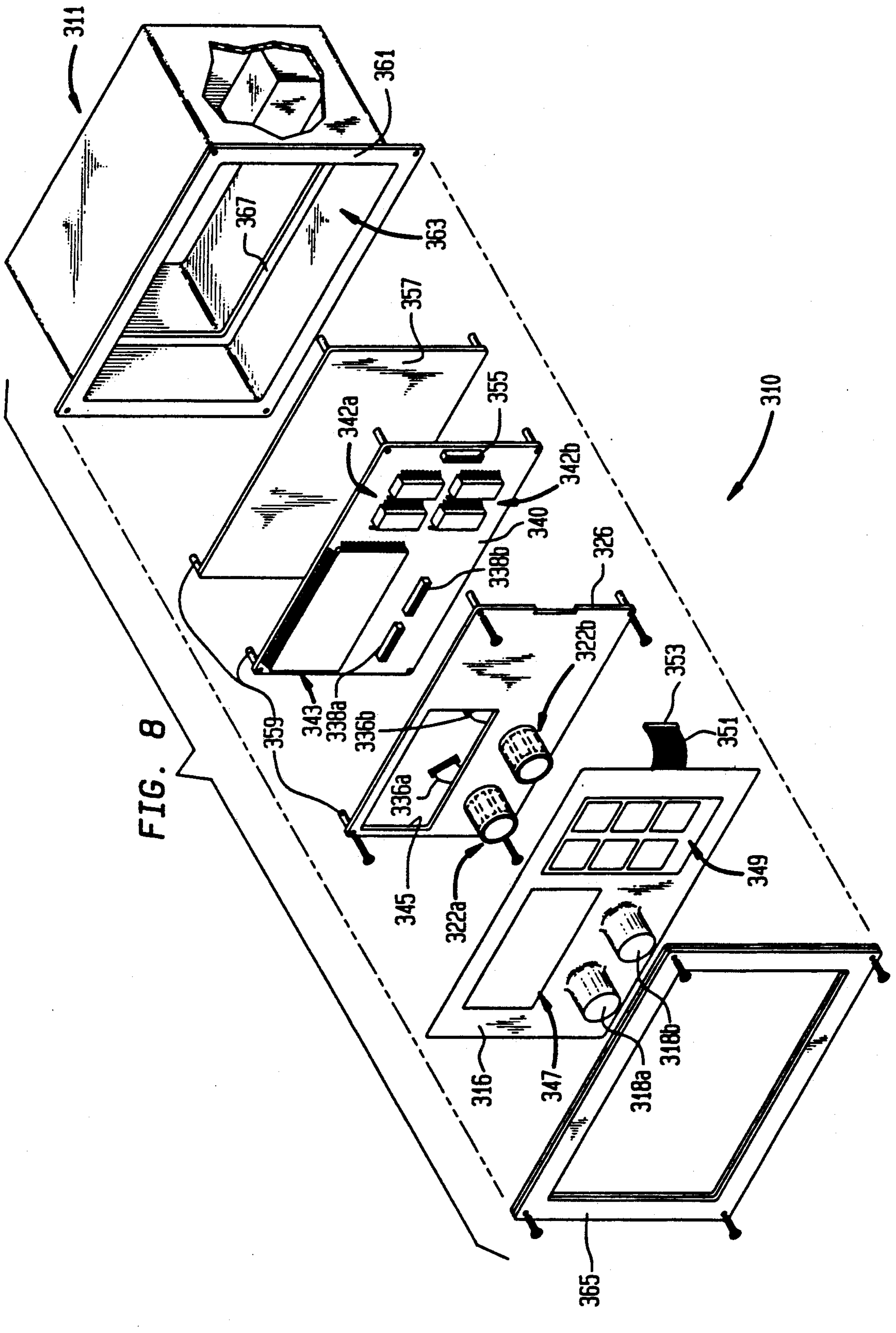

Referring now to FIG. 8, an embodiment of the invention in which two rotary switch devices are incorporated in the front panel of the utilization device that is being controlled has there been illustrated generally at 310. The utilization device 310 may comprise, for examples, an anesthesia ventilator, a carbon dioxide monitor, an oxygen monitor, or the like, that is housed in a device enclosure, shown generally at 311. In this embodiment, the front panel of the rotary switch device 310 comprises a flexible cover member 316 having knobs or protrusions 318a and 318b therein that correspond to the knob 18 of the FIGS. 1-3C embodiment. The knobs 318a and 318b of the cover member 316 encircle corresponding rotary motion sensing devices 322a and 322b carried on a backing plate 326. The outputs of the rotary motion sensing devices 322a, 322b appear on connectors 336a and 336b which plug into corresponding receptacles 338a and 338b on circuit board 340. Circuit board 340, in turn, is provided with electrical circuits and microprocessor units 342a and 342b, corresponding to those employed in the embodiment of FIGS. 1-3C, and, in addition, is provided with a display unit shown generally at 343, for example a liquid crystal display corresponding to the LCD module 102 of FIG. 5.

Backing plate 326 is provided with an opening 345 therein in alignment with the display module 343, and cover member 316 includes a display window therein, shown generally at 347, that is also in alignment with the display module 343. The display window 347 is preferably of a transparent plastic material so that the display 343 can be viewed therethrough.

Cover member 316 is also provided with a plurality of integral membrane switches, shown generally at 349, the outputs of which are fed via a suitable pigtail cable 351 and connector 353 to a receptacle 355 on the circuit board 340. Suitable circuitry (not shown) is employed in connection with the outputs of the membrane switches 349 to provide conventional on/off and other controls for the utilization device in enclosure 311. Such circuitry is of conventional construction and need not be described herein. Additional circuit boards, one of which is shown at 357, may be provided for use in connection with membrane switches 349.

A flange 361 is formed at the entrance of the enclosure 311. The flange 361 encompasses an entrance opening, shown generally at 363, into which the various circuit boards 357 and 340, and the backing plate 326, are inserted, after such members have been bolted together. A flange 365, which encircles the peripheral portion of the cover member 316, is provided to allow the cover member to be sealingly compressed against the flange 361 of enclosure 311. In addition, an internal flange 367 in enclosure 311 is abutted by the rear surface of the last of any additional circuit boards 357 that may be affixed to the circuit board 340. Suitable spacers 359 are employed on various of the circuit boards 326, 340 and 357, and on the plate 326, to properly space the various components of the assemblage so that when the flange 365 is taken up relative to the flange 361, the various components of the assemblage are fixed in place relative to the cover member 316, and the cover member is sealingly engaged against flange 361 of enclosure 311.

The embodiment of FIG. 8 thus will be seen to include a pair of rotation-sensing devices and a display unit therefor which are incorporated into the utilization device being controlled by the rotation-sensing devices. This is in contradistinction to the embodiments of FIGS. 1-7, wherein the rotary switch devices are incorporated into independent, stand alone units that are connected to their utilization devices by cables that exit from the rotary switch devices.

It will be apparent from the foregoing description that this invention provides for a variety of improved rotation-sensing devices, the interiors of which are preferably sealed from communication with ambient atmosphere. The rotation-sensing devices are essentially devoid of rotating parts but are, nevertheless, capable of sensing rotary hand motion with respect thereto and of providing an output signal corresponding to such movement.

While particular embodiments of this invention have been shown and described, it will be obvious to those skilled in the art that various other changes and modifications may be made without departing from this invention in its broader aspects, and it is, therefore, aimed in the appended claims to cover all such changes and modifications as fall within the true spirit and scope of this invention.

What is claimed is:

1. A rotation-sensing device, comprising a support; means for holding in fixed position relative to said support a protrusion having an outer periphery; means for sensing rotary movement occurring about said outer periphery and initiating signals corresponding thereto; and microprocessor means in circuit with said sensing means and constructed and arranged to receive said signals and provide output data with respect to one or another or all of the following: (i) the angular amount of rotary movement sensed by said sensing means; (ii) the direction of such rotary movement; and, (iii) the angular speed of such rotary movement.

2. A device according to claim 1, wherein said device is adapted to be mounted on an apparatus to be controlled thereby, said device further including means for coupling said microprocessor means to said apparatus to thereby facilitate inputting said output data to said apparatus.

3. A rotation-sensing device for providing output signals that correspond to rotary hand movement made about said device by an operator, said device comprising: a cover member including an outer surface having a generally cylindrical, longitudinally elongate, non-rotatable protrusion carried thereon, said protrusion projecting outwardly from said outer surface and having an outer periphery thereon; a plurality of generally longitudinally elongate, circumferentially spaced sensing means positioned adjacent said outer periphery and responsive to said rotary hand movement of the operator for providing output signals corresponding to said movement; means coupled to said sensing means for leading said signals away from said device; and microprocessor means connected in circuit with said signal leading means and constructed and arranged to interpret said signals for providing output data with respect to one or another or all of the following: (i) the angular amount of the rotary hand movement made by the operator; (ii) the angular direction of such rotary hand movement; and, (iii) the angular speed of such rotary hand movement.

4. A device according to claim 3, wherein said device is adapted to be sealingly mounted on an apparatus to be controlled by said device, and wherein said protrusion is integrally formed on said outer surface of said cover member.

5. A device according to claim 3, further including means coupled to said microprocessor means for displaying said output data to the operator.

6. A device according to claim 3, wherein said device is adapted to be mounted on an apparatus to be controlled thereby, said device further including means for coupling said microprocessor means to said apparatus to thereby facilitate inputting said output data to said apparatus.

7. A device according to any one of claims 1, 2–4, 5–6, wherein said outer periphery is cylindrical in shape, and wherein said sensing means includes a plurality of circumferentially spaced, longitudinally elongate switches carried within said protrusion adjacent said outer periphery thereof.

8. A device according to any one of claims 1, 2–4, 5–6, wherein said outer periphery comprises the outer surface of a generally cylindrical member, and wherein said sensing means includes a plurality of circumferentially spaced, longitudinally elongate, conductive, capacitance discharge members carried at or adjacent to said outer periphery of said cylindrical member.

9. A device according to claim 7, wherein said protrusion includes a generally cylindrical core member, and wherein said switches comprise a multi-layer cylindrical laminate positioned about the outer surface of said core member and having an outer surface which forms said outer periphery of said protrusion.

10. A device according to claim 9, wherein said multi-layer cylindrical laminate includes an inner layer having a plurality of pairs of longitudinally elongate conductive members formed on an outer surface thereof, each of which pairs corresponds to a separate one of said switches, an intermediate layer of insulating material having a plurality of longitudinally elongate cut-out portions formed therein, each of which cut-out portions is aligned with one of said pairs of conductive members, and an outer layer comprising a resilient membrane having conductive areas positioned on an inner surface thereof in alignment with corresponding pairs of conductive members on said inner layer and corresponding cut-out portions in said intermediate layer, said outer layer having an outer surface that constitutes said outer periphery of said protrusion, said multi-layer laminate being constructed and arranged so that rotary hand movements made by an operator who grasps said protrusion are reflected in corresponding closings and openings of said switches as the conductive areas of said outer layer are squeezed through corresponding cut-out portions of said intermediate layer into contact with corresponding pairs of conductive members on said inner layer and are then released.

11. A rotation-sensing device, comprising a support; means for defining a protrusion having an outer periphery in fixed position relative to said support; means for sensing rotary movement occurring about said outer periphery and initiating signals corresponding thereto; and means for determining from said signals the direction and angular amount of said movement.

12. A rotation-sensing device for providing output signals that correspond to rotary hand movement made about said device by an operator, said device comprising: a cover member including an outer surface having a generally cylindrical, longitudinally elongate, non-rotatable protrusion projecting outwardly from said outer surface and having an outer periphery; a plurality of generally longitudinally elongate circumferentially spaced sensing means positioned adjacent said outer periphery and responsive to said rotary hand movement of the operator for providing output signals corresponding to said movement; and means for determining from said signals the direction and angular amount of said movement.

13. A device according to claim 11 or 12, wherein said means for determining the direction and angular amount of said movement comprises a microprocessor.

14. A device according to claim 12, wherein said outer periphery of said protrusion is integrally formed with said outer surface of said cover member.

15. A device according to claim 11 or 12, further comprising means for determining from said signals the speed of said movement.

16. A device according to claim 12, further comprising a housing for mounting said cover member and means for sealing said cover member with respect to said housing.

17. A device according to claim 13, further including means coupled to said microprocessor for displaying data responsive to said direction and angular amount of said movement to the operator.

18. A device according to claim 11 or 12, wherein said sensing means includes a plurality of circumferentially spaced, longitudinally elongate switches carried within said protrusion adjacent said outer periphery.

19. A device according to claim 11 or 12, wherein said sensing means includes a plurality of circumferentially spaced, longitudinally elongate, conductive, capacitance discharge members carried at or adjacent to said outer periphery.

* * * * *